US010817470B2

(12) United States Patent
Song

(10) Patent No.: US 10,817,470 B2
(45) Date of Patent: Oct. 27, 2020

(54) CLOUD FILE TRANSMISSION METHOD, TERMINAL, AND CLOUD SERVER

(71) Applicant: Huawei Technologies Co., Ltd., Shenzhen (CN)

(72) Inventor: Lei Song, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 180 days.

(21) Appl. No.: 15/796,079

(22) Filed: Oct. 27, 2017

(65) Prior Publication Data

US 2018/0060342 A1    Mar. 1, 2018

Related U.S. Application Data

(63) Continuation of application No. PCT/CN2015/078126, filed on Apr. 30, 2015.

(51) Int. Cl.
*G06F 15/16* (2006.01)
*G06F 16/14* (2019.01)
(Continued)

(52) U.S. Cl.
CPC ............ *G06F 16/152* (2019.01); *G06F 16/40* (2019.01); *H04L 29/06047* (2013.01);
(Continued)

(58) Field of Classification Search
CPC .................................. H04L 29/08; G06F 3/067
(Continued)

(56) References Cited

U.S. PATENT DOCUMENTS 7,386,574 B2 * 6/2008 Abe ...................... H04L 29/06
709/219
9,037,682 B2 * 5/2015 Das ...................... G06F 3/0484
709/219
(Continued)

FOREIGN PATENT DOCUMENTS

CN   102387125 A   3/2012
CN   102546836 A   7/2012
(Continued)

OTHER PUBLICATIONS

Foreign Communication From a Counterpart Application, European Application No. 15890348.4, Extended European Search Report dated Jan. 26, 2018, 6 pages.
(Continued)

*Primary Examiner* — Bharat Barot
(74) *Attorney, Agent, or Firm* — Conley Rose, P.C.

(57) ABSTRACT

The present disclosure discloses a cloud file transmission method, a terminal, and a server. The method includes receiving a request for obtaining a file, where the request includes a file identifier of the file; obtaining saved first information by using the file identifier and an established first association relationship between the file identifier and the first information, where the first information is generated by performing calculation on raw data of the file, and the raw data is data that can distinguish the file from another file; sending the first information to cloud, so that the cloud finds a saved file according to the first information and an established second association relationship between the file and the first information; and receiving the file sent by the cloud. In this manner, a terminal can accurately obtain a corresponding file from cloud without being limited by an operation.

14 Claims, 7 Drawing Sheets

(51) Int. Cl.
*G06F 16/40* (2019.01)
*H04L 29/08* (2006.01)
*H04W 4/00* (2018.01)
*H04L 29/06* (2006.01)
*G06F 3/06* (2006.01)

(52) U.S. Cl.
CPC .............. *H04L 29/08* (2013.01); *H04L 67/06* (2013.01); *H04L 67/42* (2013.01); *H04W 4/00* (2013.01); *G06F 3/067* (2013.01)

(58) Field of Classification Search
USPC .................................. 709/202–203, 217–219
See application file for complete search history.

(56) References Cited

U.S. PATENT DOCUMENTS

| | | | |
|---|---|---|---|
| 9,099,151 B2* | 8/2015 | Miura ...................... | H04N 5/91 |
| 10,110,761 B2* | 10/2018 | Subana .............. | H04N 1/00344 |
| 2005/0076062 A1* | 4/2005 | Sawano .................. | G06F 16/51 |
| 2012/0278448 A1 | 11/2012 | Wang et al. | |
| 2013/0346453 A1* | 12/2013 | Procopio ............... | G06F 16/211 707/809 |
| 2014/0156793 A1 | 6/2014 | Chan et al. | |
| 2014/0244647 A1 | 8/2014 | Wyatt et al. | |
| 2018/0027075 A1* | 1/2018 | Schoeffler ........... | G06F 3/04842 707/827 |
| 2019/0007596 A1* | 1/2019 | Watanabe .......... | H04N 5/23229 |

FOREIGN PATENT DOCUMENTS

| | | |
|---|---|---|
| CN | 103049491 A | 4/2013 |
| CN | 103390012 A | 11/2013 |
| CN | 103458016 A | 12/2013 |

OTHER PUBLICATIONS

Machine Translation and Abstract of Chinese Publication No. CN103049491, Apr. 17, 2013, 16 pages.
Machine Translation and Abstract of Chinese Publication No. CN103390012, Nov. 13, 2013, 22 pages.
Machine Translation and Abstract of Chinese Publication No. CN103458016, Dec. 18, 2013, 31 pages.
Foreign Communication From a Counterpart Application, PCT Application No. PCT/CN2015/078126, English Translation of International Search Report dated Feb. 5, 2016, 2 pages.
Foreign Communication From a Counterpart Application, PCT Application No. PCT/CN2015/078126, English Translation of Written Opinion dated Feb. 5, 2016, 6 pages.

* cited by examiner

CLOUD FILE TRANSMISSION METHOD, TERMINAL, AND CLOUD SERVER

CROSS-REFERENCE TO RELATED APPLICATIONS

This application is a continuation of International Application No. PCT/CN2015/078126, filed on Apr. 30, 2015, the disclosure of which is hereby incorporated by reference in its entirety.

TECHNICAL FIELD

The present disclosure relates to the field of file transmission technologies, and in particular to, a cloud file transmission method, a terminal, and a cloud server.

BACKGROUND

Cloud storage is a cloud computing system whose core is data storage and management. To put it simply, cloud storage means that a resource required to be stored is uploaded to cloud for access by people in need. A user can connect, by using any apparatus that can be connected to a network, to cloud anytime and anywhere, so as to conveniently access data. Currently, mobile phone manufacturers have launched their own cloud storage solutions for storing key information, such as a photograph or a video shot by a mobile phone, or user information.

In some approaches, after backing up a local original picture (for example, a photograph) to cloud, a mobile phone usually locally caches only a thumbnail of the original picture. When a user requests to browse an original picture, the mobile phone sends a request to the cloud to request to download the original high-definition picture. A size of an original picture is 2 MB to 4 MB; and a size of a thumbnail of the original picture is 100 KB to 200 KB, which is about ½₀ of the original picture. Therefore, a mobile phone caches only a thumbnail, and does not cache an original picture, and excessively little storage space of a mobile phone is occupied. Generally, an original picture in a cloud is associated with a thumbnail in a local mobile phone only by using a file name. Therefore, the cloud searches for the stored original picture by using the file name.

However, when a user moves the local thumbnail to a different storage location or changes the file name of the local thumbnail, the thumbnail in the local mobile phone is not associated with the original picture in the cloud, and consequently, the user cannot obtain the high-definition picture of the original picture in the cloud.

SUMMARY

To resolve a main technical problem, the present disclosure provides a cloud file transmission method, a terminal, and a cloud server, so that a corresponding file can be accurately obtained from cloud without being limited by an operation, for example, when a user changes a name of the file or moves an icon of the file to a different location. Therefore, terminal use experience of the user can be greatly improved.

According to a first aspect, the present disclosure provides a cloud file transmission method, including receiving a request for obtaining a file, where the request includes a file identifier of the file; obtaining saved first information by using the file identifier and an established first association relationship between the file identifier and the first information, where the first information is generated by performing calculation on raw data of the file, and the raw data is data that can distinguish the file from another file; sending the first information to cloud, so that the cloud finds a saved file according to the first information and an established second association relationship between the file and the first information; and receiving the file sent by the cloud.

In a first possible implementation manner of the first aspect, before the step of receiving a request for obtaining a file, the method includes performing calculation on the raw data of the file to generate the first information; and sending the file that carries the first information to the cloud, so that the cloud saves the file and establishes the second association relationship between the file and the first information.

In a second possible implementation manner of the first aspect, before the step of receiving a request for obtaining a file, the method includes sending the file to the cloud; and receiving the first information sent by the cloud and establishing the first association relationship between the file identifier and the first information, where the first information is generated by the cloud by performing calculation on the raw data of the file.

In a third possible implementation manner of the first aspect, the file identifier is a file name of the file.

In a fourth possible implementation manner of the first aspect, the first information is a check result generated by performing calculation on the raw data of the file by using a check algorithm.

In a fifth possible implementation manner of the first aspect, the first information is a message digest result generated by performing calculation on the raw data of the file by using a message digest algorithm.

In a sixth possible implementation manner of the first aspect, the file is a picture in a Joint Photographic Experts Group (JPEG) format; and before the step of receiving a request for obtaining a file, the method includes converting the picture into a thumbnail, and using a file name of the thumbnail as a file name of the picture; performing calculation on raw data of the picture to generate the first information; saving the file name of the picture and the first information in an exchangeable image file (EXIF) table of the thumbnail; and sending the picture that carries the file name of the picture and the first information to the cloud, so that the cloud saves the picture and establishes a third association relationship between the picture, the file name of the picture, and the first information.

According to a second aspect, the present disclosure provides a cloud file transmission method, including receiving first information sent by a terminal, where the first information is generated by performing calculation on raw data of the file, and the raw data is raw data that can distinguish the file from another file; searching for a saved file according to the first information and an established second association relationship between the file and the first information; and sending the found file to the terminal.

In a first possible implementation manner of the second aspect, before the step of receiving first information sent by a terminal, the method includes receiving the file that is sent by the terminal and that carries the first information, so that the cloud saves the file and establishes the second association relationship between the file and the first information.

In a second possible implementation manner of the second aspect, before the step of receiving first information sent by a terminal, the method includes receiving the file sent by the terminal; performing calculation on the raw data of the file to generate the first information; and sending the first information to the terminal, so that the terminal establishes a first association relationship between a file identifier of the file and the first information.

In a third possible implementation manner of the second aspect, the file identifier is a file name of the file.

In a fourth possible implementation manner of the second aspect, the first information is a check result generated by performing calculation on the raw data of the file by using a check algorithm.

In a fifth possible implementation manner of the second aspect, the first information is a message digest result generated by performing calculation on the raw data of the file by using a message digest algorithm.

In a sixth possible implementation manner of the second aspect, the file is a picture in a JPEG format; and before the step of receiving first information sent by a terminal, the method includes receiving the picture sent by the terminal; converting the picture into a thumbnail, and using a file name of the thumbnail as a file name of the picture; performing calculation on raw data of the picture to generate the first information; saving the file name of the picture and the first information in an EXIF table of the thumbnail; and sending the thumbnail to the terminal, so that the terminal establishes a third association relationship between the picture, the file name of the picture, and the first information.

According to a third aspect, the present disclosure provides a terminal, where the terminal includes a first receiving module, an obtaining module, a first sending module, and a second receiving module, where the first receiving module is configured to receive a request for obtaining a file, where the request includes a file identifier of the file; the obtaining module is configured to obtain saved first information by using the file identifier and an established first association relationship between the file identifier and the first information, where the first information is generated by performing calculation on raw data of the file, and the raw data is data that can distinguish the file from another file; the first sending module is configured to send the first information to cloud, so that the cloud finds a saved file according to the first information and an established second association relationship between the file and the first information; and the second receiving module is configured to receive the file sent by the cloud.

In a first possible implementation manner of the third aspect, the terminal further includes a first generation module and a second sending module, where the first generation module is configured to perform calculation on the raw data of the file to generate the first information; and the second sending module is configured to send the file that carries the first information to the cloud, so that the cloud saves the file and establishes the second association relationship between the file and the first information.

In a second possible implementation manner of the third aspect, the terminal further includes a third sending module and a third receiving module, where the third sending module is configured to send the file to the cloud; and the third receiving module is configured to receive the first information sent by the cloud and establish the first association relationship between the file identifier and the first information, where the first information is generated by the cloud by performing calculation on the raw data of the file.

In a third possible implementation manner of the third aspect, the file identifier is a file name of the file.

In a fourth possible implementation manner of the third aspect, the first information is a check result generated by performing calculation on the raw data of the file by using a check algorithm.

In a fifth possible implementation manner of the third aspect, the first information is a message digest result generated by performing calculation on the raw data of the file by using a message digest algorithm.

In a sixth possible implementation manner of the third aspect, the file is a picture in a JPEG format; and the terminal further includes a conversion module, a second generation module, a storage module, and a fourth sending module, where the conversion module is configured to convert the picture into a thumbnail, and use a file name of the thumbnail as a file name of the picture; the second generation module is configured to perform calculation on raw data of the picture to generate the first information; the storage module is configured to store the file name of the picture and the first information in an EXIF table of the thumbnail; and the fourth sending module is configured to send the picture that carries the file name of the picture and the first information to the cloud, so that the cloud saves the picture and establishes a third association relationship between the picture, the file name of the picture, and the first information.

According to a fourth aspect, the present disclosure provides a cloud server, where the server includes a first receiving module, a search module, and a first sending module, where the first receiving module is configured to receive first information sent by a terminal, where the first information is generated by performing calculation on raw data of the file, and the raw data is data that can distinguish the file from another file; the search module is configured to search for a saved file according to the first information and an established second association relationship between the file and the first information; and the first sending module is configured to send the found file to the terminal.

In a first possible implementation manner of the fourth aspect, the server further includes a second receiving module, where the second receiving module is configured to receive the file that is sent by the terminal and that carries the first information, so that the cloud saves the file and establishes the second association relationship between the file and the first information.

In a second possible implementation manner of the fourth aspect, the server further includes a third receiving module, a first generation module, and a second sending module, where the third receiving module is configured to receive the file sent by the terminal; the first generation module is configured to perform calculation on the raw data of the file to generate the first information; and the second sending module is configured to send the first information to the terminal, so that the terminal establishes a first association relationship between a file identifier of the file and the first information.

In a third possible implementation manner of the fourth aspect, the file identifier is a file name of the file.

In a fourth possible implementation manner of the fourth aspect, the first information is a check result generated by performing calculation on the raw data of the file by using a check algorithm.

In a fifth possible implementation manner of the fourth aspect, the first information is a message digest result generated by performing calculation on the raw data of the file by using a message digest algorithm.

In a sixth possible implementation manner of the fourth aspect, the file is a picture in a JPEG format; and the server further includes a fourth receiving module, a conversion module, a second generation module, a storage module, and a third sending module, where the fourth receiving module is configured to receive the file sent by the terminal; the conversion module is configured to convert the picture into a thumbnail, and use a file name of the thumbnail as a file name of the picture; the second generation module is configured to perform calculation on raw data of the picture to generate the first information; the storage module is configured to store the file name of the picture and the first information in an EXIF table of the thumbnail; and the third sending module is configured to send the thumbnail to the terminal, so that the terminal establishes a third association relationship between the picture, the file name of the picture, and the first information.

According to a fifth aspect, the present disclosure provides a terminal, where the terminal includes a processor, a memory coupled to the processor, a receiver, and a transmitter, where the receiver is configured to receive a request for obtaining a file, where the request includes a file identifier of the file; the memory is configured to store an established first association relationship between the file identifier and the first information, and store the first information; the processor is configured to invoke the memory, and obtain saved first information by using the file identifier and the established first association relationship that is between the file identifier and the first information and that is stored in the memory, where the first information is generated by performing calculation on raw data of the file, and the raw data is data that can distinguish the file from another file; the transmitter is configured to send, under control of the processor, the first information to cloud, so that the cloud finds a saved file according to the first information and an established second association relationship between the file and the first information; and the receiver is configured to receive, under control of the processor, the file sent by the cloud, and store the file in the memory.

According to a sixth aspect, the present disclosure provides a cloud server, where the server includes a processor, a memory coupled to the processor, a receiver, and a transmitter, where the memory is configured to store first information, store an established second association relationship between a file and the first information, and store the file; the receiver is configured to receive, under control of the processor, the first information sent by a terminal, where the first information is generated by performing calculation on raw data of the file, and the raw data is data that can distinguish the file from another file; the processor is configured to invoke the memory, and search for, according to the first information and the established second association relationship that is between the file and the first information and that is stored in the memory, the file stored in the memory; and the transmitter is configured to send, under control of the processor, the found file to the terminal.

A beneficial effect of the present disclosure is different from some approaches, in the present disclosure, a request for obtaining a file is received, where the request includes a file identifier of the file; saved first information is obtained by using the file identifier and an established first association relationship between the file identifier and the first information; the first information is sent to a cloud; and then the file sent by the cloud is received. The first information is generated by performing calculation on raw data of the file, and the raw data is data that can distinguish the file from another file. Therefore, in this manner, a user can accurately obtain a corresponding file from cloud without being limited by an operation, for example, when a user changes a name of the file or moves an icon of the file to a different location. Further, terminal use experience of a user can be greatly improved.

DESCRIPTION OF EMBODIMENTS

In the following, the present disclosure is described in detail with reference to the accompanying drawings and implementation manners.

Figure 1:
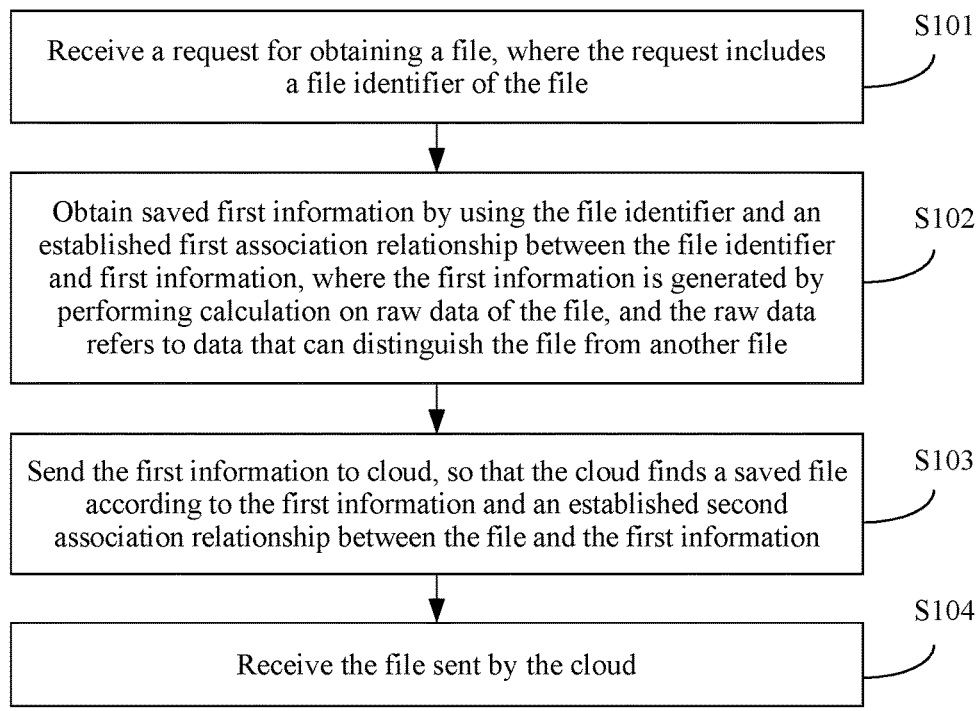
FIG. 1 is a flowchart of an implementation manner of a cloud file transmission method according to the present disclosure.

Referring to FIG. 1, FIG. 1 is a flowchart of an implementation manner of a cloud file transmission method according to the present disclosure. This flowchart is a flowchart executed from a perspective of a terminal. An application scenario of the method is because of limited storage space, a terminal usually uploads a file (especially a file that occupies large space, such as a picture) to cloud for saving; when requesting to obtain a file, a user downloads a corresponding file from the cloud to the terminal. In the present disclosure, a new association relationship is established, so as to accurately obtain a corresponding file, even if a user performs an operation such as changing a name of the file or moving an icon of the file to a different location. The method may include the following steps.

Step S101: Receive a request for obtaining a file, where the request includes a file identifier of the file.

A file identifier is used to identify a file, and there is a corresponding association relationship between the file identifier and the file. A user can send, in many manners, a request for obtaining a file, for example a user taps an icon of the file, or a user sends a request by entering a name of the file, or a user enters an incomplete character to search, and then taps a corresponding search result. In these manners, the icon, the name of the file, a character, and the like are all file identifiers. After a terminal receives these requests of the user, a request for obtaining a file is received.

Step S102: Obtain saved first information by using the file identifier and an established first association relationship between the file identifier and the first information, where the first information is generated by performing calculation on raw data of the file, and the raw data is data that can distinguish the file from another file.

Raw data of a file is inherent data in the file, and can distinguish the file from another file, such as a creation date or time of the file, a file type (an office document, a picture, a video, audio, user information, a PDF document, or the like), a file size, and characteristic content of the file. If the file is a picture, raw data may further include various photographing conditions, such as a photographing aperture, a shutter, white balance, light sensitivity ISO, and a focal length, and a brand, a model, and a color code that are of a camera used for photographing, and a sound recorded during photographing. When a file is created in the terminal, the raw data is inherent and unique data that is distinguished from raw data of another file.

An expression form of the data is binary data. First information may be generated by performing calculation on the data (that is, binary data). Because raw data is inherent and unique data that is distinguished from raw data of another file, first information has a corresponding feature, that is, same first information is obtained by performing calculation on same raw data, and different first information is obtained by performing calculation on different raw data. Therefore, if the first information is the same, it can be considered that this file is a file required by a user; or if the first information is different, it can be considered that this file is not a file required by a user. First information of a file remains unchanged even if a user performs an operation such as changing a name of the file or moving an icon of the file to a different location. Therefore, a corresponding file can be accurately determined according to the first information.

First information is information used to search for a file, and a first association relationship between a file identifier and first information is pre-established. After a request for obtaining a file by a user is received, saved first information may be obtained by using the file identifier and the established first association relationship between the file identifier and the first information.

Step S103: Send the first information to cloud, so that the cloud finds a saved file according to the first information and an established second association relationship between the file and the first information.

The cloud saves the file, and further stores the established second association relationship between the file and the first information. The first information is sent to the cloud, so that after receiving the first information, the cloud may find the saved file according to the established second association relationship between the file and the first information.

Step S104: Receive the file sent by the cloud.

In this implementation manner of the present disclosure, a request for obtaining a file is received, where the request includes a file identifier of the file; saved first information is obtained by using the file identifier and an established first association relationship between the file identifier and the first information; the first information is sent to a cloud; and then the file sent by the cloud is received. The first information is generated by performing calculation on raw data of the file, and the raw data is data that can distinguish the file from another file. Therefore, in this manner, a user can accurately obtain a corresponding file from cloud without being limited by an operation, for example, when a user changes a name of the file or moves an icon of the file to a different location. Further, terminal use experience of a user can be greatly improved.

In the present disclosure, before start of a process in FIG. 1, a process in which calculation is performed on raw data of a file to generate first information may be executed in a terminal, or may be executed in a cloud. Detailed processes are separately described.

Figure 2:
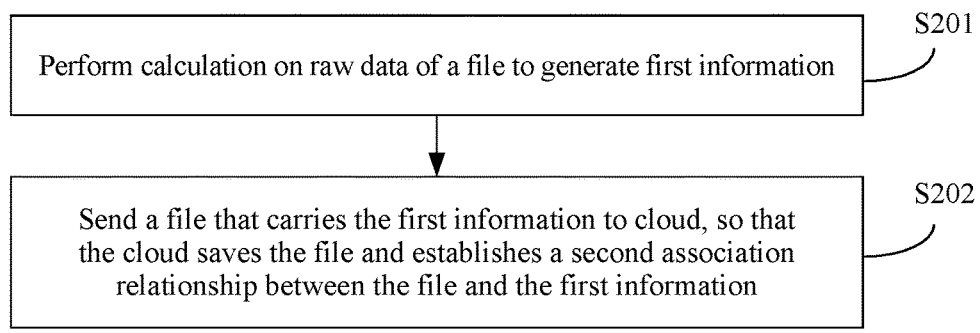
FIG. 2 is a flowchart of another implementation manner of a cloud file transmission method according to the present disclosure.

For a process in which calculation is performed on raw data of a file to generate first information and that is executed in a terminal, refer to FIG. 2. Before step S101, the method includes the following steps.

Step S201: Perform calculation on raw data of a file to generate first information.

Step S202: Send a file that carries the first information to cloud, so that the cloud saves the file and establishes a second association relationship between the file and the first information.

Figure 3:
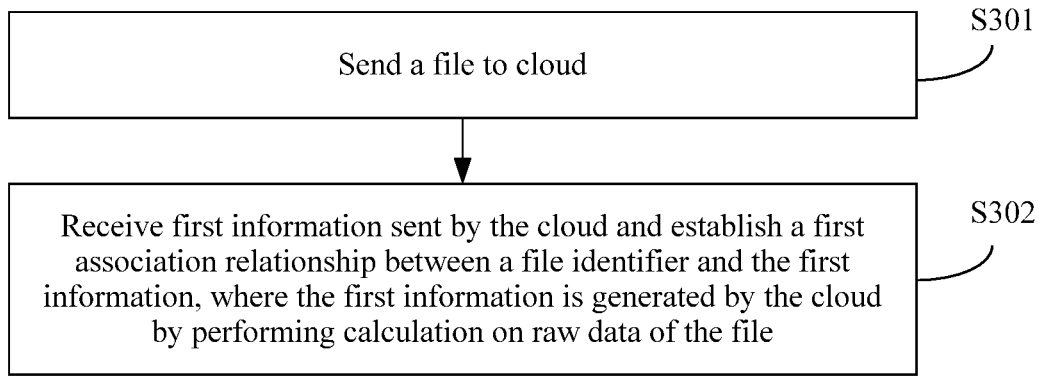
FIG. 3 is a flowchart of still another implementation manner of a cloud file transmission method according to the present disclosure.

For a process in which calculation is performed on raw data of a file to generate first information and that is executed in a cloud, refer to FIG. 3. From a perspective of a terminal, before step S101, the method includes the following steps.

Step S301: Send the file to a cloud.

Step S302: Receive first information sent by the cloud and establish a first association relationship between a file identifier and the first information, where the first information is generated by the cloud by performing calculation on raw data of the file.

The first information is a check result generated by performing calculation on the raw data of the file by using a check algorithm. The check algorithm includes but is not limited to a cyclic redundancy algorithm, a hash algorithm, and a parity algorithm.

When code is entered into a computer or another device as data, an input error may easily occur. To reduce an input error, coding experts invent various check and error detection methods, and set check codes according to these methods. Code (for example, organization code) with a check code includes two parts: a master code and a check code. The master code represents a number of a coded object; and the check code is a number that is appended to the master code and that is used to check accuracy of the master code in an input process. Each master code can have only one check code, and the check code is obtained according to a specified mathematical relationship. Therefore, in this application, the raw data of the file is entered as the master code, and a check code (a check result) may be obtained according to a specified mathematical relationship. Each master code has only one check code, and there is only one check result of the raw data of the file, so that an association relationship between a file and a check result can be formed.

The first information is a message digest result generated by performing calculation on the raw data of the file by using a message digest algorithm. The message digest algorithm includes but is not limited to an MD5 algorithm and an SHA-1 algorithm.

A main feature of the message digest algorithm is that a key is not required in an encryption process, and encrypted data cannot be decrypted. A same ciphertext can be obtained only by using a same message digest algorithm after same cleartext data is entered. Therefore, message digest results obtained by performing calculation on raw data of same files by using a message digest algorithm are the same, so that an association relationship between a file and a message digest result can be formed.

The file identifier is a file name of the file.

When the file identifier is a file name of the file, the terminal may further send the file name of the file to the cloud. When the cloud searches for the file, a preliminary search may be performed by using the file name, and then comparison is further performed by using first information (such as a check result and a message digest result), so as to ensure that a found file is a corresponding file required by a user.

It can be learned from data of user research that, currently, consumers have a requirement for classifying different photographs by themselves. Therefore, a file name is generally assigned to a file, and a feature that a file identifier is a file name of a file can meet the foregoing requirement of the user, so as to improve user experience.

The file is a picture in a JPEG format.

Figure 4:
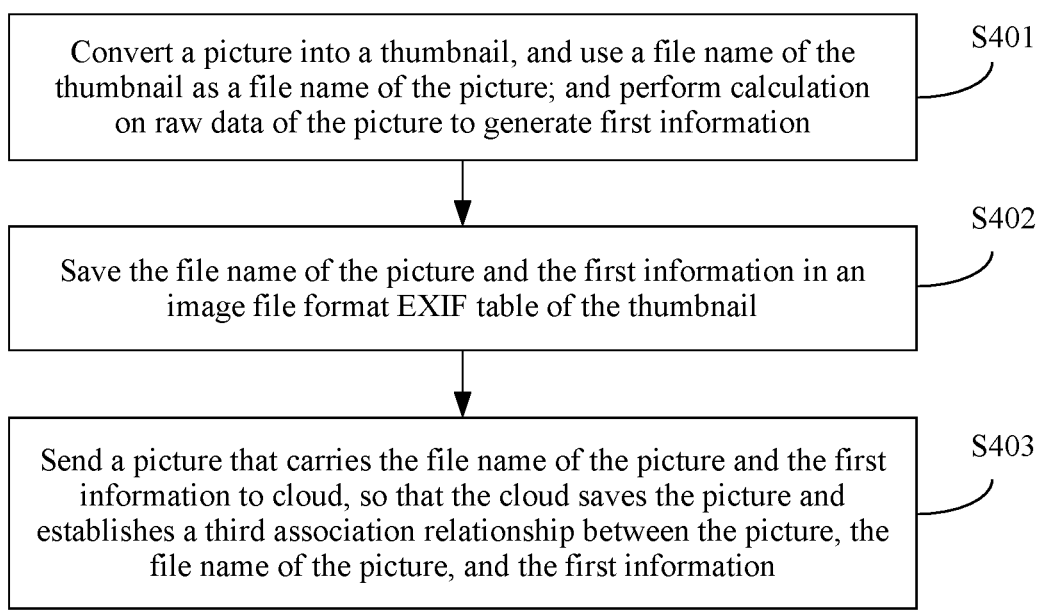
FIG. 4 is a flowchart of yet another implementation manner of a cloud file transmission method according to the present disclosure.

In this case, referring to FIG. 4, before step S101, the method includes the following steps.

Step S401: Convert a picture into a thumbnail, and use a file name of the thumbnail as a file name of the picture; and perform calculation on raw data of the picture to generate first information.

The first information may be generated by performing calculation on the raw data of the picture by using a check algorithm or a message digest algorithm.

Step S402: Store the file name of the picture and the first information in an EXIF table of the thumbnail. For the EXIF table of the thumbnail, refer to Table 1.

TABLE 1

| EXIF Table of Thumbnail | |
|---|---|
| ... | ... |
| File Name | xxxx.jpg |
| Check Result | xxxxx |
| ... | ... |

Step S403: Send a picture that carries the file name of the picture and the first information to cloud, so that the cloud saves the picture and establishes a third association relationship between the picture, the file name of the picture, and the first information.

After receiving a request for obtaining the file, the terminal first extracts the file name and a check result of the file in the EXIF table of the thumbnail, and sends the file name and the check result (first information) to the cloud, so that the cloud finds the file according to the file name and the check result. The cloud first performs preliminary search by using the file name, and then further performs comparison by using the check result, so as to ensure that a found picture is a file corresponding to a thumbnail.

Figure 5:
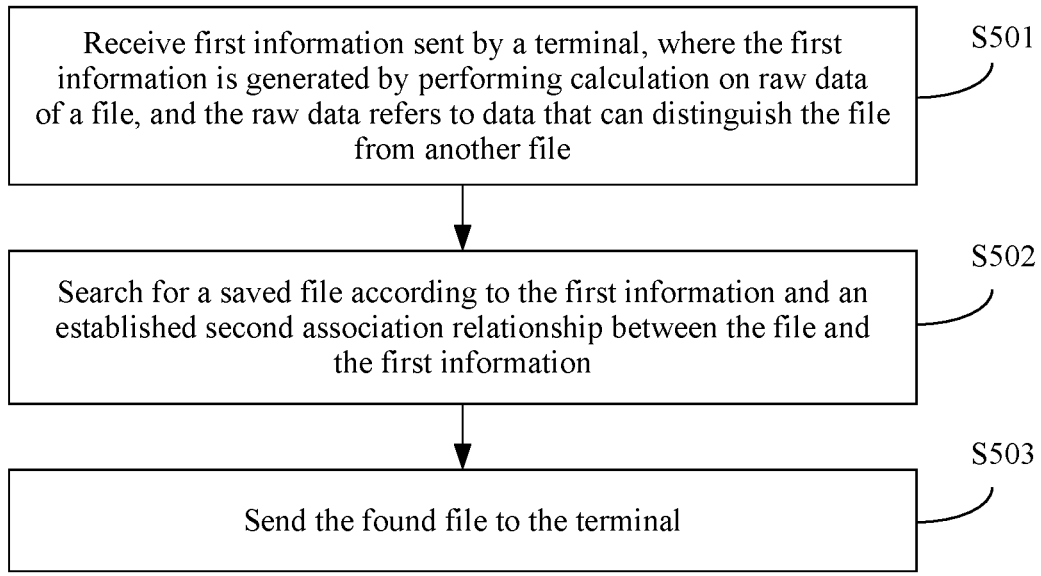
FIG. 5 is a flowchart of still yet another implementation manner of a cloud file transmission method according to the present disclosure.

Referring to FIG. 5, FIG. 5 is a flowchart of still yet another implementation manner of a cloud file transmission method according to the present disclosure. This flowchart corresponds to a flowchart of FIG. 1, and is a flowchart executed from a perspective of a cloud. The method may include the following steps.

Step S501: Receive first information sent by a terminal, where the first information is generated by performing calculation on raw data of a file, and the raw data is data that can distinguish the file from another file.

Raw data of a file is inherent data in the file, and can be used to distinguish the file from another file, such as a creation date or time of a file, a file type (such as an office document, a picture, and a PDF document), a file size, and file characteristic content. If the file is a picture, raw data may further include various photographing conditions, such as a photographing aperture, a shutter, white balance, light sensitivity ISO, and a focal length, and a brand, a model, and a color code that are of a camera used for photographing, and a sound recorded during photographing. When a file is created in the terminal, the raw data is inherent and unique data that is distinguished from raw data of another file.

An expression form of the raw data is binary data. First information may be generated by performing calculation on the raw data (that is, binary data). Because raw data is inherent and unique data that is distinguished from raw data of another file, first information has a corresponding feature, that is, same first information is obtained by performing calculation on same raw data, and different first information is obtained by performing calculation on different raw data. Therefore, if the first information is the same, it can be considered that this file is a file required by a user; or if the first information is different, it can be considered that this file is not a file required by a user. First information of a file remains unchanged even if a user performs an operation such as changing a name of the file or moving an icon of the file to a different location. Therefore, a corresponding file can be accurately determined according to the first information.

Step S502: Search for a saved file according to the first information and an established second association relationship between the file and the first information.

A second association relationship between a file and first information is pre-established. After the first information sent by the terminal is received, the file may be found by using the first information and the established second association relationship between the file and the first information.

Step S503: Send the found file to the terminal.

In this implementation manner of the present disclosure, first information is generated by performing calculation on raw data of a file, and the raw data is data that can distinguish the file from another file. Therefore, in this manner, a cloud can accurately find a corresponding file without being limited by an operation, for example, when a user changes a name of the file or moves an icon of the file to a different location. Further, terminal use experience of a user can be greatly improved.

In the present disclosure, before start of a process in FIG. 5, a process in which calculation is performed on raw data of a file to generate first information may be executed in a terminal, or may be executed in a cloud. Detailed processes are separately described.

Figure 6:
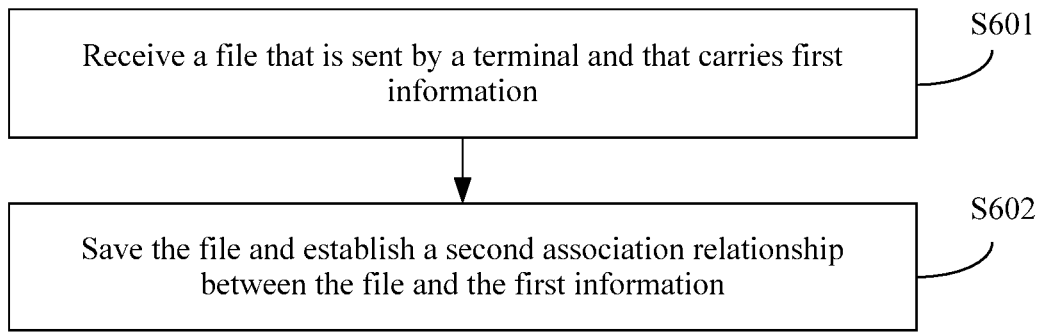
FIG. 6 is a flowchart of a further implementation manner of a cloud file transmission method according to the present disclosure.

For a process in which calculation is performed on raw data of a file to generate first information and that is executed in a terminal, refer to FIG. 6. From a perspective of a cloud, before step S501, the method includes the following steps Step S601: Receive a file that is sent by a terminal and that carries first information.

Step S602: Store the file and establish a second association relationship between the file and the first information.

The process in which calculation is performed on raw data of a file to generate first information is executed in the terminal. Therefore, the terminal sends the file that carries the first information to the cloud in advance. After receiving the file, the cloud saves the file and establishes the second association relationship between the file and the first information.

Figure 7:
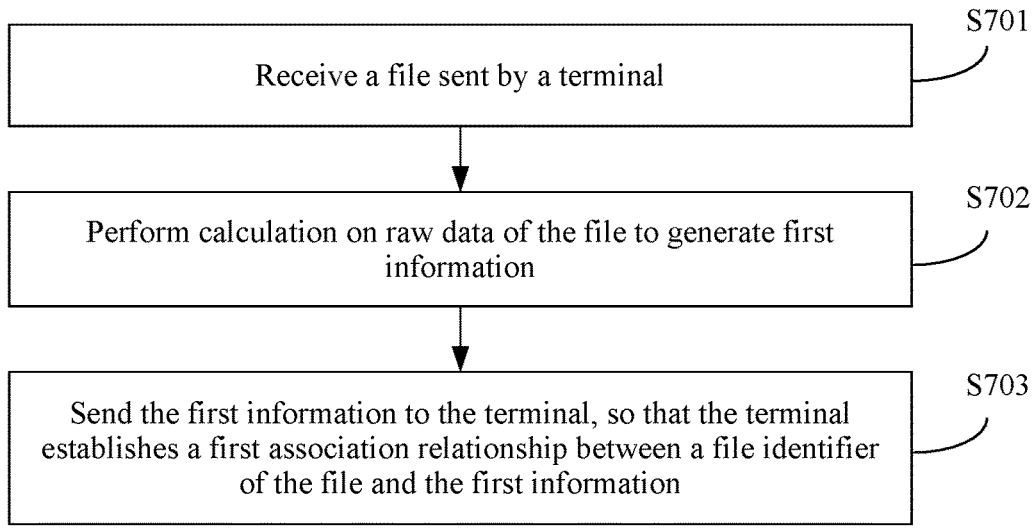
FIG. 7 is a flowchart of a still further implementation manner of a cloud file transmission method according to the present disclosure.

For a process in which calculation is performed on raw data of a file to generate first information and that is executed in a cloud, refer to FIG. 7. From a perspective of the cloud, before step S501, the method includes the following steps.

Step S701: Receive a file sent by a terminal.

Step S702: Perform calculation on raw data of the file to generate first information.

Step S703: Send the first information to the terminal, so that the terminal establishes a first association relationship between a file identifier of the file and the first information.

The first information is a check result generated by performing calculation on the raw data of the file by using a check algorithm. The check algorithm includes but is not limited to a cyclic redundancy algorithm, a hash algorithm, and a parity algorithm.

When code is entered into a computer or another device as data, an input error may easily occur. To reduce an input error, coding experts invent various check and error detection methods, and set check codes according to these methods. Code (for example, organization code) with a check code includes two parts: a master code and a check code. The master code represents a number of a coded object; and the check code is a number that is appended to the master code and that is used to check accuracy of the master code in an input process. Each master code can have only one check code, and the check code is obtained according to a specified mathematical relationship. Therefore, in this application, the raw data of the file is entered as the master code, and a check code (a check result) may be obtained according to a specified mathematical relationship. Each master code has only one check code, and there is only one check result of the raw data of the file, so that an association relationship between a file and a check result can be formed. The file has a file identifier in the terminal, and further, an association relationship between the file identifier and the check result is formed.

The first information is a message digest result generated by performing calculation on the raw data of the file by using a message digest algorithm. The message digest algorithm includes but is not limited to an MD5 algorithm and an SHA-1 algorithm.

A main feature of the message digest algorithm is that a key is not required in an encryption process, and encrypted data cannot be decrypted. A same ciphertext can be obtained only by using a same message digest algorithm after same cleartext data is entered. Therefore, message digest results obtained by performing calculation on raw data of same files by using a message digest algorithm are the same, so that an association relationship between a file and a message digest result can be formed.

The file identifier is a file name of the file.

When the file identifier is a file name of the file, the terminal may further send the file name to the cloud. When the cloud searches for the file, a preliminary search may be performed by using the file name, and then comparison is further performed by using first information (such as a check result and a message digest result), so as to ensure that a found file is a corresponding file required by a user.

It can be learned from data of user research that, currently, consumers have a requirement for classifying different photographs by themselves. Therefore, a file name is generally assigned to a file, and a feature that a file identifier is a file name of a file can meet the foregoing requirement of the user, so as to improve user experience.

The file is a picture in a JPEG format.

Figure 8:
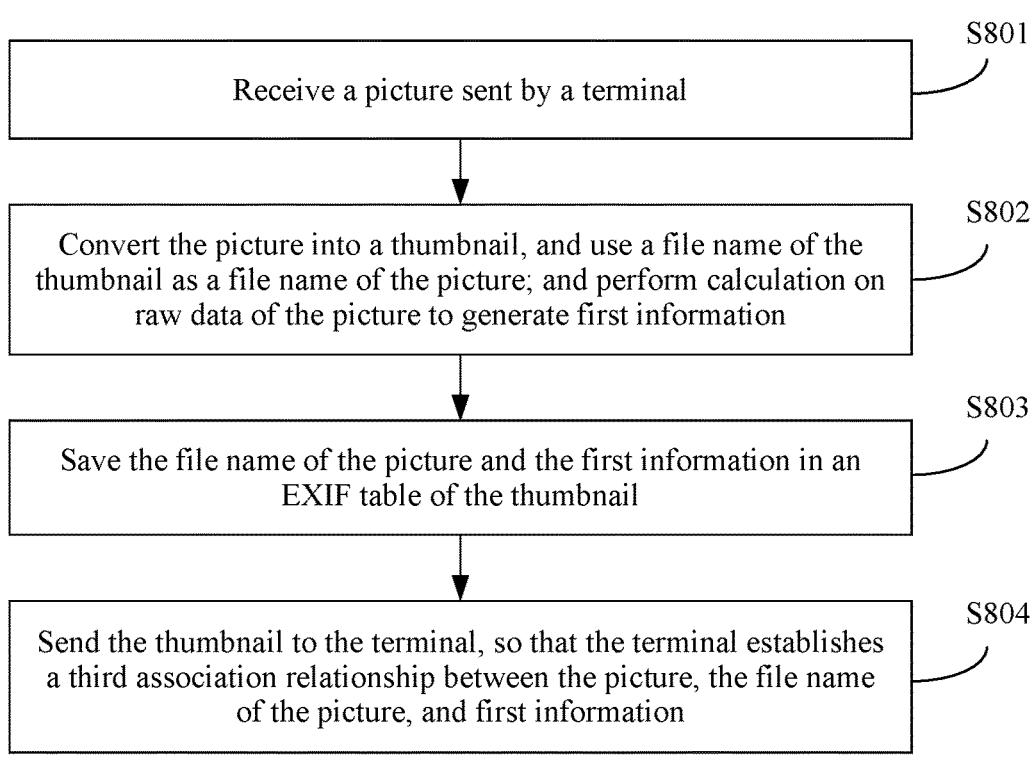
FIG. 8 is a flowchart of a yet further implementation manner of a cloud file transmission method according to the present disclosure.

In this case, referring to FIG. 8, before step S501, the method includes the following steps.

Step S801: Receive a picture sent by a terminal.

Step S802: Convert the picture into a thumbnail, and use a file name of the thumbnail as a file name of the picture; and perform calculation on raw data of the picture to generate first information.

The first information may be generated by performing calculation on the raw data of the picture by using a check algorithm or a message digest algorithm.

Step S803: Store the file name of the picture and the first information in an EXIF table of the thumbnail.

Step S804: Send the thumbnail to the terminal, so that the terminal establishes a third association relationship between the picture, the file name of the picture, and first information.

Figure 9:
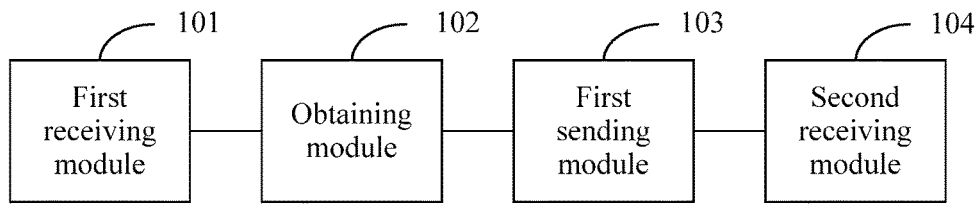
FIG. 9 is a schematic structural diagram of an implementation manner of a terminal according to the present disclosure.

Referring to FIG. 9, FIG. 9 is a schematic structural diagram of an implementation manner of a terminal according to the present disclosure. The steps in FIG. 1 to FIG. 4 may be executed by the terminal. For detailed description, refer to related text description in the foregoing method process. The terminal includes a first receiving module 101, an obtaining module 102, a first sending module 103, and a second receiving module 104.

The first receiving module 101 is configured to receive a request for obtaining a file, where the request includes a file identifier of the file.

The obtaining module 102 is configured to obtain saved first information by using the file identifier and an established first association relationship between the file identifier and the first information, where the first information is generated by performing calculation on raw data of the file, and the raw data is data that can distinguish the file from another file.

The first sending module 103 is configured to send the first information to cloud, so that the cloud finds a saved file according to the first information and an established second association relationship between the file and the first information.

The second receiving module 104 is configured to receive the file sent by the cloud.

In this implementation manner of the present disclosure, a request for obtaining a file is received, where the request includes a file identifier of the file; saved first information is obtained by using the file identifier and an established first association relationship between the file identifier and the first information; the first information is sent to a cloud; and then the file sent by the cloud is received. The first information is generated by performing calculation on raw data of the file, and the raw data is data that can distinguish the file from another file. Therefore, in this manner, a user can accurately obtain a corresponding file from cloud without being limited by an operation, for example, when a user changes a name of the file or moves an icon of the file to a different location. Further, terminal use experience of a user can be greatly improved.

Figure 10:
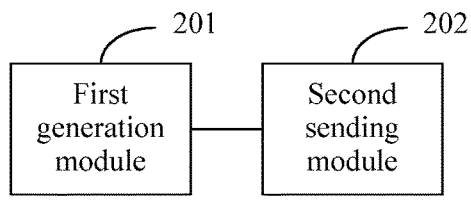
FIG. 10 is a schematic structural diagram of another implementation manner of a terminal according to the present disclosure.

Referring to FIG. 10, the terminal further includes a first generation module 201 and a second sending module 202.

The first generation module 201 is configured to perform calculation on the raw data of the file to generate the first information.

The second sending module 202 is configured to send the file that carries the first information to the cloud, so that the cloud saves the file and establishes the second association relationship between the file and the first information.

Figure 11:
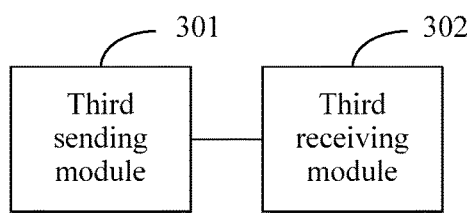
FIG. 11 is a schematic structural diagram of still another implementation manner of a terminal according to the present disclosure.

Referring to FIG. 11, the terminal further includes a third sending module 301 and a third receiving module 302.

The third sending module 301 is configured to send the file to the cloud.

The third receiving module 302 is configured to receive the first information sent by the cloud and establish the first association relationship between the file identifier and the first information, where the first information is generated by the cloud by performing calculation on the raw data of the file.

The file identifier is a file name of the file.

The first information is a check result generated by performing calculation on the raw data of the file by using a check algorithm.

The first information is a message digest result generated by performing calculation on the raw data of the file by using a message digest algorithm.

The file is a picture in a JPEG format.

Figure 12:
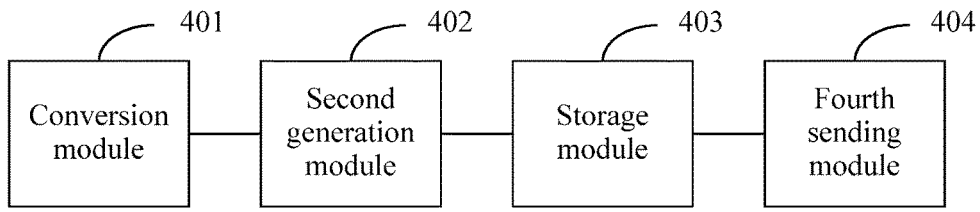
FIG. 12 is a schematic structural diagram of yet another implementation manner of a terminal according to the present disclosure.

Referring to FIG. 12, the terminal further includes a conversion module 401, a second generation module 402, a storage module 403, and a fourth sending module 404.

The conversion module 401 is configured to convert the picture into a thumbnail, and use a file name of the thumbnail as a file name of the picture.

The second generation module 402 is configured to perform calculation on raw data of the picture to generate the first information.

The storage module 403 is configured to store the file name of the picture and the first information in an EXIF table of the thumbnail.

The fourth sending module 404 is configured to send the picture that carries the file name of the picture and the first information to the cloud, so that the cloud saves the picture and establishes a third association relationship between the picture, the file name of the picture, and the first information.

Figure 13:
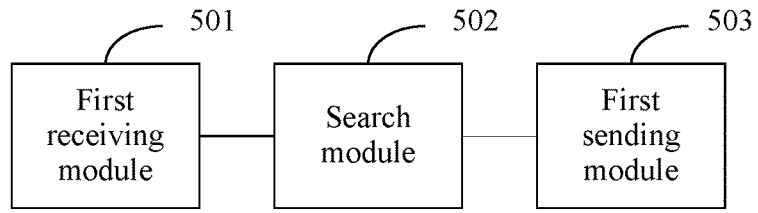
FIG. 13 is a schematic structural diagram of an implementation manner of a cloud server according to the present disclosure.

Referring to FIG. 13, FIG. 13 is a schematic structural diagram of an implementation manner of a cloud server according to the present disclosure. The steps in FIG. 5 to FIG. 8 may be executed by the server. For detailed description, refer to related text description in the foregoing method process. The server includes a first receiving module 501, a search module 502, and a first sending module 503.

The first receiving module 501 is configured to receive first information sent by a terminal, where the first information is generated by performing calculation on raw data of the file, and the raw data is data that can distinguish the file from another file.

The search module 502 is configured to search for a saved file according to the first information and an established second association relationship between the file and the first information.

The first sending module 503 is configured to send the found file to the terminal.

In this implementation manner of the present disclosure, first information is generated by performing calculation on raw data of a file, and the raw data is data that can distinguish the file from another file. Therefore, in this manner, a cloud can accurately find a corresponding file without being limited by an operation, for example, when a user changes a name of the file or moves an icon of the file to a different location. Further, terminal use experience of a user can be greatly improved.

Figure 14:
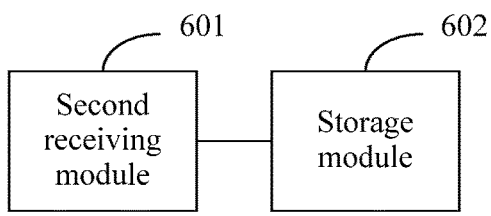
FIG. 14 is a schematic structural diagram of another implementation manner of a cloud server according to the present disclosure.

Referring to FIG. 14, the server further includes a second receiving module 601 and a storage module 602.

The second receiving module 601 is configured to receive the file that is sent by the terminal and that carries the first information.

The storage module 602 is configured to store the file and establish the second association relationship between the file and the first information.

Figure 15:
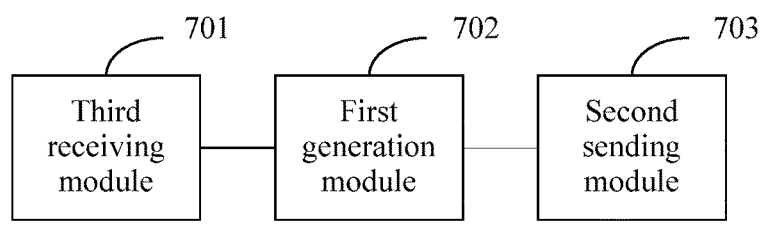
FIG. 15 is a schematic structural diagram of still another implementation manner of a cloud server according to the present disclosure.

Referring to FIG. 15, the server further includes a third receiving module 701, a first generation module 702, and a second sending module 703.

The third receiving module 701 is configured to receive the file sent by the terminal.

The first generation module 702 is configured to perform calculation on the raw data of the file to generate the first information.

The second sending module 703 is configured to send the first information to the terminal, so that the terminal establishes a first association relationship between a file identifier of the file and the first information.

The file identifier is a file name of the file.

The first information is a check result generated by performing calculation on the raw data of the file by using a check algorithm.

The first information is a message digest result generated by performing calculation on the raw data of the file by using a message digest algorithm.

The file is a picture in a JPEG format.

Figure 16:
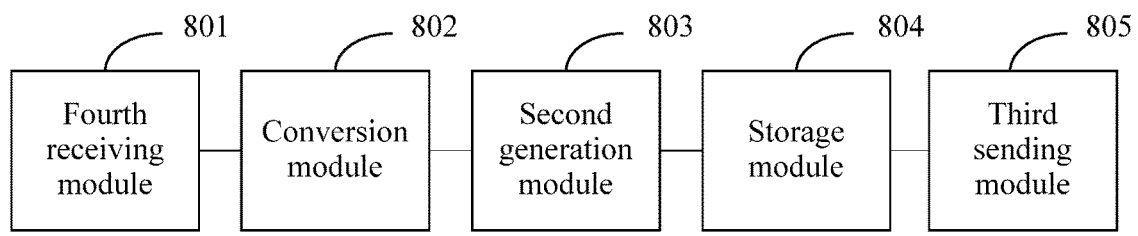
FIG. 16 is a schematic structural diagram of yet another implementation manner of a cloud server according to the present disclosure.

Referring to FIG. 16, the server further includes a fourth receiving module 801, a conversion module 802, a second generation module 803, a storage module 804, and a third sending module 805.

The fourth receiving module 801 is configured to receive the file sent by the terminal.

The conversion module 802 is configured to convert the picture into a thumbnail, and use a file name of the thumbnail as a file name of the picture.

The second generation module 803 is configured to perform calculation on raw data of the picture to generate the first information.

The storage module 804 is configured to store the file name of the picture and the first information in an EXIF table of the thumbnail.

The third sending module 805 is configured to send the thumbnail to the terminal, so that the terminal establishes a third association relationship between the picture, the file name of the picture, and the first information.

Figure 17:
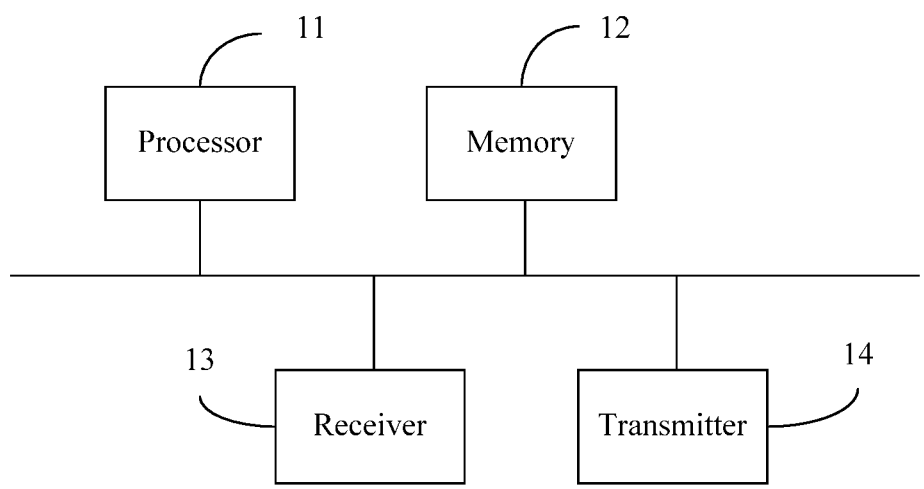
FIG. 17 is a schematic structural diagram of an entity apparatus of an implementation manner of a terminal according to the present disclosure.

Referring to FIG. 17, FIG. 17 is a schematic structural diagram of an entity apparatus of an implementation manner of a terminal according to the present disclosure. The steps in FIG. 1 to FIG. 4 may be executed by the terminal in this implementation manner. For detailed description, refer to related text description in the foregoing method process.

The terminal includes a processor 11, a memory 12 coupled to the processor 11, a receiver 13, and a transmitter 14.

The receiver 11 is configured to receive a request for obtaining a file, where the request includes a file identifier of the file.

The memory 12 is configured to store an established first association relationship between the file identifier and the first information, and store the first information.

The processor 11 is configured to invoke the memory 12, and obtain saved first information by using the file identifier and the established first association relationship that is between the file identifier and the first information and that is stored in the memory 12, where the first information is generated by performing calculation on raw data of the file, and the raw data is data that can distinguish the file from another file.

The transmitter 13 is configured to send, under control of the processor 11, the first information to cloud, so that the cloud finds a saved file according to the first information and an established second association relationship between the file and the first information.

The receiver 14 is configured to receive, under control of the processor 11, the file sent by the cloud, and store the file in the memory.

In this implementation manner of the present disclosure, a request for obtaining a file is received, where the request includes a file identifier of the file; saved first information is obtained by using the file identifier and an established first association relationship between the file identifier and the first information; the first information is sent to a cloud; and then the file sent by the cloud is received. The first information is generated by performing calculation on raw data of the file, and the raw data is data that can distinguish the file from another file. Therefore, in this manner, a user can accurately obtain a corresponding file from cloud without being limited by an operation, for example, when a user changes a name of the file or moves an icon of the file to a different location. Further, terminal use experience of a user can be greatly improved.

Figure 18:
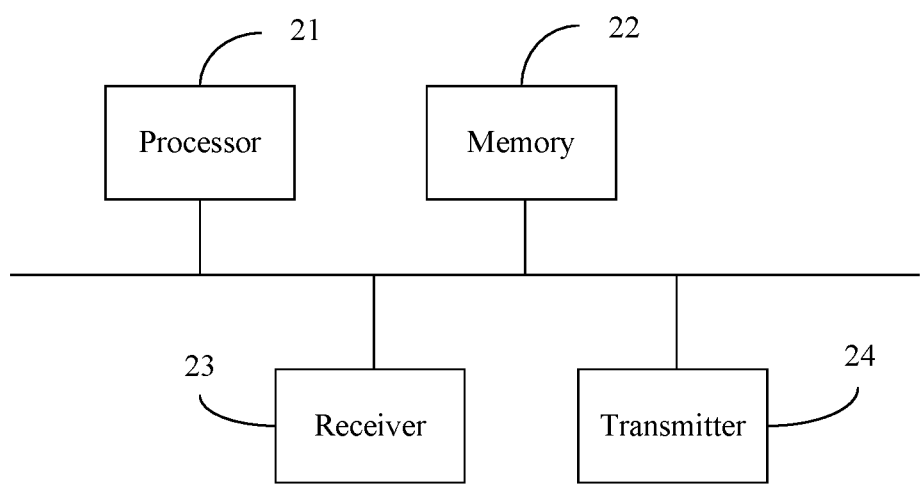
FIG. 18 is a schematic structural diagram of an entity apparatus of an implementation manner of a cloud server according to the present disclosure.

Referring to FIG. 18, FIG. 18 is a schematic structural diagram of an entity apparatus of an implementation manner of a cloud server according to the present disclosure. The steps in FIG. 5 to FIG. 8 may be executed by a terminal in this implementation manner. For detailed description, refer to related text description in the foregoing method process.

The server includes a processor 21, a memory 22 coupled to the processor 21, a receiver 23, and a transmitter 24.

The memory 22 is configured to store first information, store an established second association relationship between a file and the first information, and store the file.

The receiver 23 is configured to receive, under control of a processor, the first information sent by a terminal, where the first information is generated by performing calculation on raw data of the file, and the raw data is raw data that can distinguish the file from another file.

The processor 21 is configured to invoke the memory 22, and search for, according to the first information and the established second association relationship that is between the file and the first information and that is stored in the memory 22, the file stored in the memory 22.

The transmitter 24 is configured to send, under control of the processor 21, the found file to the terminal.

In this implementation manner of the present disclosure, first information is generated by performing calculation on raw data of a file, and the raw data is data that can distinguish the file from another file. Therefore, in this manner, a cloud can accurately find a corresponding file without being limited by an operation, for example, when a user changes a name of the file or moves an icon of the file to a different location. Further, terminal use experience of a user can be greatly improved.

In the several embodiments provided in the present disclosure, it should be understood that the disclosed system, apparatus, and method may be implemented in other manners. For example, the described apparatus embodiment is merely an example. For example, the module or unit division is merely logical function division and may be other division in implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to needs to achieve the objectives of the solutions of the embodiments.

In addition, function units in the embodiments of the present disclosure may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of the present disclosure essentially, or the part contributing to some approaches, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely embodiments of the present disclosure, and are not intended to limit the scope of the present disclosure. An equivalent structural or equivalent process alternation made by using the content of the specification and drawings of the present disclosure, or an application of the content of the specification and drawings directly or indirectly to another related technical field, shall fall within the protection scope of the present disclosure.

What is claimed is:

1. A computer program product comprising computer-executable instructions for storage on a non-transitory computer-readable storage medium that, when executed by a processor, cause an apparatus to:

receive a request for obtaining a file, wherein the file comprises a picture in a Joint Photographic Experts Group (JPEG) format and an associated thumbnail, wherein the file name of the picture comprises the file name of the thumbnail, and wherein the request comprises the file name;

generate first information by applying a check algorithm to raw data of the file, wherein the raw data distinguishes the file from another file;

save the file name and first information in an exchange image file (EXIF) table of the thumbnail;

obtain saved first information using the file name and an established first association relationship between the file name and the first information;

send the first information to a cloud, such that the cloud is configured to find a saved file based on the first information and an established second association relationship between the file and the first information;

send the picture corresponding to the file name of the picture and the first information to the cloud, wherein the cloud saves the picture and establishes a third association relationship between the picture, the file name of the picture, and the first information; and receive the file from the cloud.

2. The computer program product of claim 1, further comprising computer-executable instructions for causing the apparatus to, prior to receiving the request for obtaining the file:

apply the check algorithm to the raw data of the file to generate the first information; and send the file and the first information to the cloud, wherein the cloud saves the file and establishes the second association relationship between the file and the first information.

3. The computer program product of claim 1, further comprising computer-executable instructions for causing the apparatus to, prior to receiving the request for obtaining the file:

send the file to the cloud; and receive the first information from the cloud and establish the first association relationship between the file name and the first information, wherein the first information is generated by the cloud by applying a check algorithm to the raw data of the file.

4. The computer program product of claim 1, wherein the first information comprises a check result generated by applying cyclic redundancy algorithm to the raw data file.

5. The computer program product of claim 1, wherein the first information comprises a message digest result generated by applying the check algorithm to the raw data of the file using a message digest algorithm.

6. A computer program product comprising computer-executable instructions for storage on a non-transitory computer-readable storage medium that, when executed by a processor, cause an apparatus to perform cloud file transmission steps comprising:

receiving a file from a terminal, wherein the file comprises a picture in a Joint Photographic Experts Group (JPEG) format;

converting the file into a thumbnail, wherein the name of the thumbnail is comprises the file name;

receiving first information from the terminal, wherein the first information is generated by applying a check algorithm to raw data of the file, and wherein the raw data distinguishes the file from another file;

saving the file name and the first information in an exchange image file (EXIF) table of the thumbnail;

searching for a saved file based, at least in part, on the first information, and an established second association relationship between the file and the first information; and sending the saved file to the terminal.

7. The computer program product of claim 6, further comprising computer-executable instructions for causing the apparatus to, prior to receiving the first information, receive the file and the first information from the terminal, wherein the cloud saves the file and establishes the second association relationship between the file and the first information.

8. The computer program product of claim 6, further comprising computer-executable instructions for causing the apparatus to, prior to receiving the first information:

receive the file from the terminal;

apply the check algorithm to the raw data of the file to generate the first information; and send the first information to the terminal, so that the terminal establishes a first association relationship between a file name and the first information.

9. The computer program product of claim 6, wherein the first information comprises a check result generated by applying a hash algorithm to the raw data file.

10. The computer program product of claim 6, wherein the first information comprises a message digest result generated by applying a message digest algorithm to the raw data file.

11. A terminal comprising:

a receiver configured to:

convert a file into a thumbnail, wherein the file comprises a picture in a Joint Photographic Experts Group (JPEG) format, and wherein the file name of the picture comprises the file name of the thumbnail;

perform a check algorithm on raw data of the picture to generate first information;

save the file name of the picture and the first information in an exchange image file (EXIF) table of the thumbnail;

send the picture corresponding to the file name of the picture and the first information to the cloud; and receive a request for obtaining a file, wherein the request comprises a file name of the file;

a memory configured to:

store an established first association relationship between the file name and first information; and store the first information generated by applying a check algorithm to raw data of the file, wherein the raw data distinguishes the file from another file;

a processor coupled to the receiver and the memory, wherein the processor is configured to:

invoke the memory; and obtain saved first information using the file name and the established first association relationship; and a transmitter coupled to the processor and configured to send, under control of the processor, the first information to a cloud, wherein the receiver is further configured to:

receive the file from the cloud; and store the file in the memory.

12. The terminal of claim 11, wherein prior to the terminal receiving the request for obtaining the file, the transmitter is further configured to send the file to the cloud.

13. The terminal of claim 11, wherein the first information comprises a check result generated by applying a parity algorithm to the raw data file.

14. The terminal of claim 11, wherein the first information comprises a message digest result generated by applying a message digest algorithm to the raw data file.

* * * * *